United States Patent
Salsman

(10) Patent No.: US 8,988,394 B2
(45) Date of Patent: Mar. 24, 2015

(54) ELECTRONIC DEVICES WITH CAMERA-BASED USER INTERFACES

(71) Applicant: Semiconductor Components Industries, LLC, Phoenix, AZ (US)

(72) Inventor: Kenneth Edward Salsman, Pleasanton, CA (US)

(73) Assignee: Semiconductor Components Industries, LLC, Phoeniz, AZ (US)

( * ) Notice: Subject to any disclaimer, the term of this patent is extended or adjusted under 35 U.S.C. 154(b) by 65 days.

(21) Appl. No.: 13/660,920

(22) Filed: Oct. 25, 2012

(65) Prior Publication Data

US 2013/0100020 A1      Apr. 25, 2013

Related U.S. Application Data

(60) Provisional application No. 61/551,136, filed on Oct. 25, 2011.

(51) Int. Cl.
*G06F 3/041*        (2006.01)
*G06F 3/042*        (2006.01)

(52) U.S. Cl.
CPC ...... *G06F 3/042* (2013.01); *G06F 2203/04101* (2013.01); *G06F 2203/04801* (2013.01)
USPC .......................................... 345/175; 345/158

(58) Field of Classification Search
CPC .............................. G06F 3/0421; G06F 3/0412
USPC .................. 345/156–158, 167, 173–175, 163
See application file for complete search history.

(56) References Cited

U.S. PATENT DOCUMENTS

| | | | |
|---|---|---|---|
| 6,842,175 B1 | 1/2005 | Schmalstieg et al. | |
| 7,697,827 B2 * | 4/2010 | Konicek | 396/56 |
| 2008/0150913 A1 * | 6/2008 | Bell et al. | 345/175 |
| 2010/0091110 A1 * | 4/2010 | Hildreth | 348/169 |
| 2010/0283833 A1 | 11/2010 | Yeh | |
| 2011/0103643 A1 * | 5/2011 | Salsman et al. | 382/103 |
| 2012/0035934 A1 * | 2/2012 | Cunningham | 704/260 |
| 2012/0081611 A1 * | 4/2012 | Tan et al. | 348/584 |
| 2012/0127128 A1 * | 5/2012 | Large et al. | 345/175 |
| 2012/0207345 A1 * | 8/2012 | Tang | 382/103 |
| 2013/0215014 A1 * | 8/2013 | Pryor | 345/156 |

* cited by examiner

*Primary Examiner* — Ricardo L Osorio
(74) *Attorney, Agent, or Firm* — Treyz Law Group; Joseph Guihan; Kendall P. Woodruff

(57) ABSTRACT

Electronic devices may include touch-free user input components that include camera modules having overlapping fields-of-view. The overlapping fields-of-view may form a gesture tracking volume in which multi-dimensional user gestures can be tracked using images captured with the camera modules. A camera module may include an image sensor having an array of image pixels and a diffractive element that redirects light onto the array of image pixels. The diffractive element may re-orient the field-of-view of each camera module so that an outer edge of the field-of-view runs along an outer surface of a display for the device. The device may include processing circuitry that operates the device using user input data based on the user gestures in the gesture tracking volume. The processing circuitry may operate the display based on the user gestures by displaying regional markers having a size and a location that depend on the user gestures.

10 Claims, 5 Drawing Sheets

US 8,988,394 B2

ELECTRONIC DEVICES WITH CAMERA-BASED USER INTERFACES

This application claims the benefit of provisional patent application No. 61/551,136, filed Oct. 25, 2011, which is hereby incorporated by reference herein in its entirety.

BACKGROUND

This relates generally to electronic devices, and more particularly, to electronic devices with optically-based user interface components.

Typical user interfaces for electronic devices such as cameras, computers, and televisions are based on buttons, switches, or touch technologies such as capacitive or resistive touch technologies that form a portion of a device display. In some devices, optical interface components based on light beam occlusion or light reflection have been provided.

Interface components based on buttons and switches may require aesthetically undesirable external protrusions. Interface components based on resistive and capacitive touch technologies can be expensive to implement, can require touches to a display that can affect optical performance, and can add to the weight and bulk of a device, particularly in large devices such as televisions.

It would therefore be desirable to be able to provide improved interfaces for electronic devices.

DETAILED DESCRIPTION

Electronic devices such as digital cameras, computers, cellular telephones, televisions or other electronic devices may be provided with camera-based optical user interface components. These camera-based optical user interface components may include one, two, three, four or more user interface camera modules that, in combination, gather user input data in response to three-dimensional user gestures in a given volume of space in the vicinity of the device. Each user interface camera module may include diffractive optical elements that redirect light onto one or more image sensors that have arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
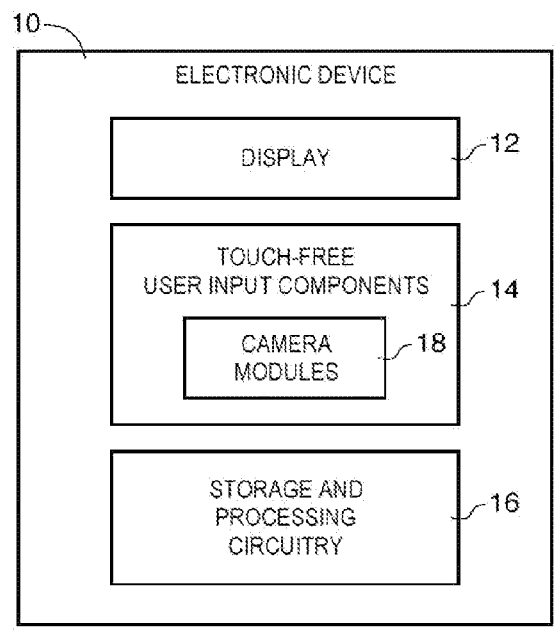
FIG. 1 is a diagram of an illustrative electronic device having a camera-based user interface in accordance with an embodiment of the present invention.

FIG. 1 is a diagram of an illustrative electronic device that includes camera-based user input components such as touch-free user interface components having user interface camera modules. Electronic device 10 of FIG. 1 may be a portable electronic device such as a camera, a cellular telephone, a video camera, a television, a computer, or other electronic device.

As shown in FIG. 1, device 10 may include a display such as display 12 for displaying visual content to a user of the device. Device 10 may include camera-based user input components such as touch-free user interface components 14. Touch-free user interface components 14 may include one or more camera modules 18. Camera modules 18 may be used to gather user input data based on user gestures in the vicinity of camera modules 18. For example, two or more camera modules 18 may continuously capture images of a user input member such as a user's hand or finger. Camera modules 18 may provide image data to circuitry such as storage and processing circuitry 16.

Processing circuitry 16 may be used to determine and track a three-dimensional position of the user input member using the continuously captured images. Processing circuitry 16 may alter the operation of the device (e.g., by altering visual content displayed on display 12 or by launching software applications for device 10) based on the determined three-dimensional position of the user input member and/or based on changes in the determined three-dimensional position of the user input member.

Processing circuitry 16 may include one or more integrated circuits (e.g., image processing circuits, microprocessors, storage devices such as random-access memory and non-volatile memory, etc.) and may be implemented using components that are separate from camera modules 18 and/or that form part of camera modules 18. Image data that has been captured by camera modules 18 may be processed and stored using processing circuitry 16. Processed image data may, if desired, be provided to external equipment (e.g., a computer or other device) using wired and/or wireless communications paths coupled to processing circuitry 16.

Figure 2:
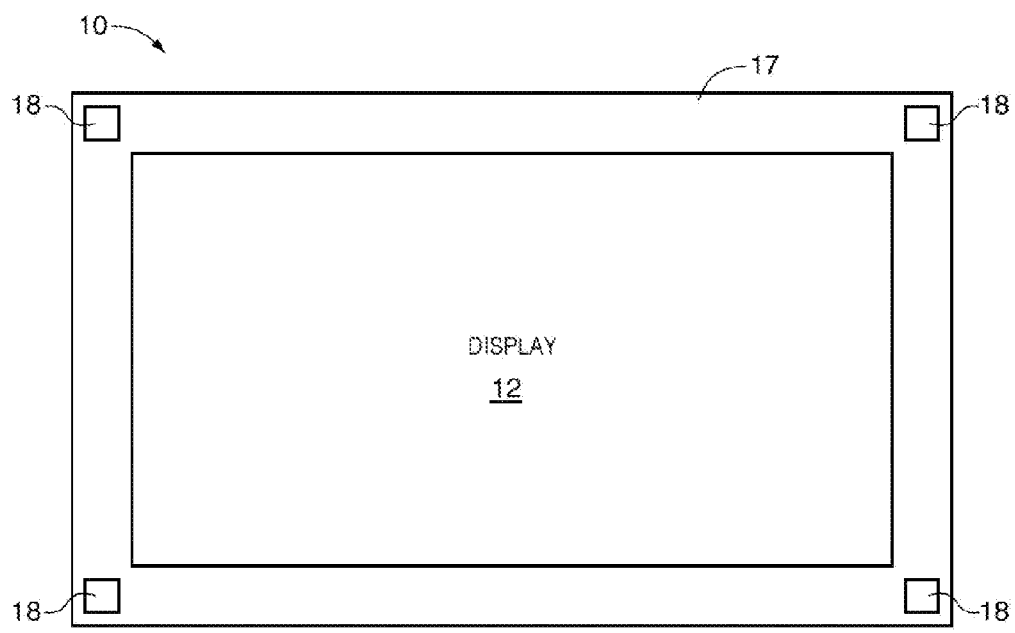
FIG. 2 is a top view of an illustrative electronic device having user interface cameras in accordance with an embodiment of the present invention.

FIG. 2 is a top view of device 10 showing how camera modules (cameras) 18 may be mounted within a housing structure such as housing structure 17. Cameras 18 may be mounted adjacent to the corners of display 12. In the example of FIG. 2, device 10 includes four camera modules 18, each mounted near a particular corner of display 12. However, this is merely illustrative. Device 10 may include two camera modules, three camera modules, four camera modules or more than four camera modules. Camera modules 18 may be mounted at the corners of display 12 or elsewhere (e.g., along edges of display 12) within housing structure 17.

In the example of FIG. 2, the outer surface of device 10 includes display 12. However, this is merely illustrative. Camera modules 18 may be positioned around any portion of a device or around a portion of a non-device surface (e.g., a desk surface, a wall, etc.), thereby creating a work surface over which user gestures may be tracked using camera modules 18. In configurations in which camera modules 18 are positioned around a non-device surface, user input data gathered by the camera modules may be transmitted to the device over a wired or wireless connection and the device may operate a display that is separate from the work surface based on the transmitted user input data.

Each camera module 18 may be sensitive to a given color of light or a given lighting pattern generated by a light source (e.g., an infrared light source) in device 10. In this way, camera modules 18 may be provided with the ability to track multiple objects (e.g., multiple fingers or multiple hands) simultaneously and control the operation of the device based on the motions of the multiple objects.

Figure 3:
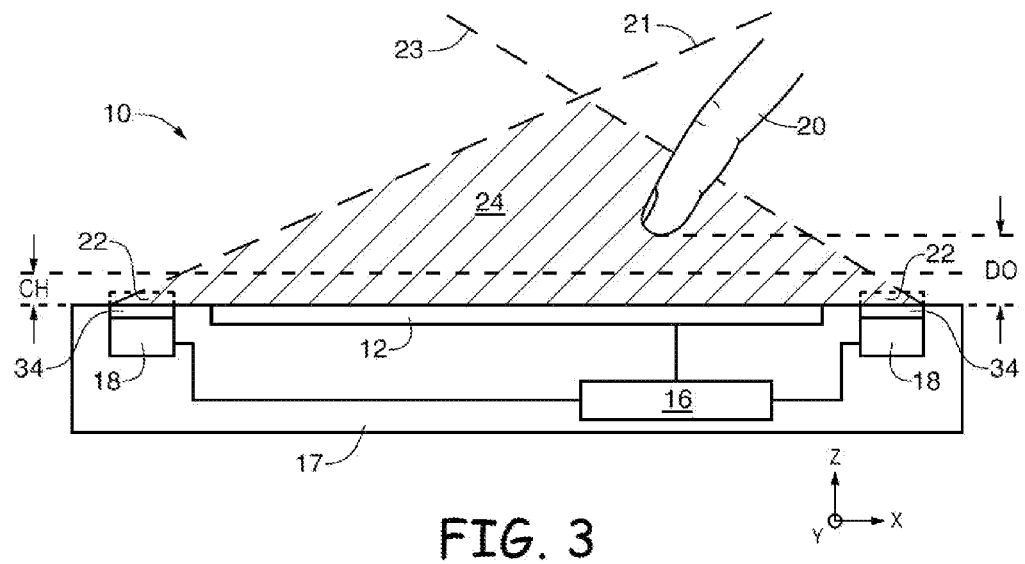
FIG. 3 is a cross-sectional side view of an illustrative electronic device having user interface cameras showing a three-dimensional tracking volume generated by the user interface cameras in accordance with an embodiment of the present invention.

Each camera module 18 may have field-of-view that includes a volume of space located adjacent to an outer surface of some or all of display 12 (or other work surface) as shown in the cross-sectional side view of device 10 in FIG. 3. Each camera module 18 may include a diffractive element 34 that controls the field-of-view of that camera module and steers the image path for that camera module off of a normal optical imaging path. Camera modules 18 may therefore be positioned near display 12 in an orientation in which the camera module is pointed nearly perpendicular to the surface of display 12. Camera modules 18 may have an outer surface formed in a common plane with the outer surface of display 12 (or in a common plane with another outer surface of device 10) or may have a portion 22 that protrudes beyond the outer surface of the display or protrudes beyond another outer surface of device 10.

Diffractive elements 34 in each camera module 18 may provide that camera module with a field-of-view that has a first extreme edge at or near the surface of display 12 (or other work area of device 10) and an second (outer) extreme edge several inches above the surface of display 12 (or other work area). For example, a first camera module 18 may have a field-of-view with a first edge that extends along the surface of the display and an outer edge 21 that extends at an angle away from the surface of the display. A second camera module 18 may have a field-of-view with a first edge that extends along the surface of the display and an outer edge 23 that extends at an additional angle away from the surface of the display. In this way, a camera module that is positioned in a plane with the display or slightly protruding above the plane of the display may be provided with a field-of-view that extends across the outer surface of the display.

The fields-of-view of multiple camera modules 18 may overlap to form an overlap region such as gesture tracking volume 24. When a user input member such as user finger 20 is located within volume 24, image data from multiple camera modules 18 may be combined (e.g., using processing circuitry 16) to determine a three-dimensional location (i.e., distances in the x, y, and z directions of FIG. 3 from a reference point such as the center of display 12) of member 20. In additional to determining an x-position and a y-position of member 20, circuitry 16 may determine an object distance DO from the surface of display 12 (or other work surface). Circuitry 16 may generate a response on display 12 based on the determined three-dimensional location of member 20 and based on changes in the determined three-dimensional location of member 20. Circuitry 16 may also determine whether object distance DO of member 20 is greater than or less than a cursor height CH from the surface of display 12 (or other work surface). Circuitry 16 may generate a first type of response to member 20 when object distance DO is greater than cursor height CH and a second type of response that is different from the first type of response when object distance DO is less that cursor height CH. For example, device 10 may accept three-dimensional gestures from a user when object distance DO is greater than cursor height CH and may switch to a two-dimensional cursor mode that only accepts two-dimensional projections of gestures from the user when object distance DO is less that cursor height CH.

Figure 4:
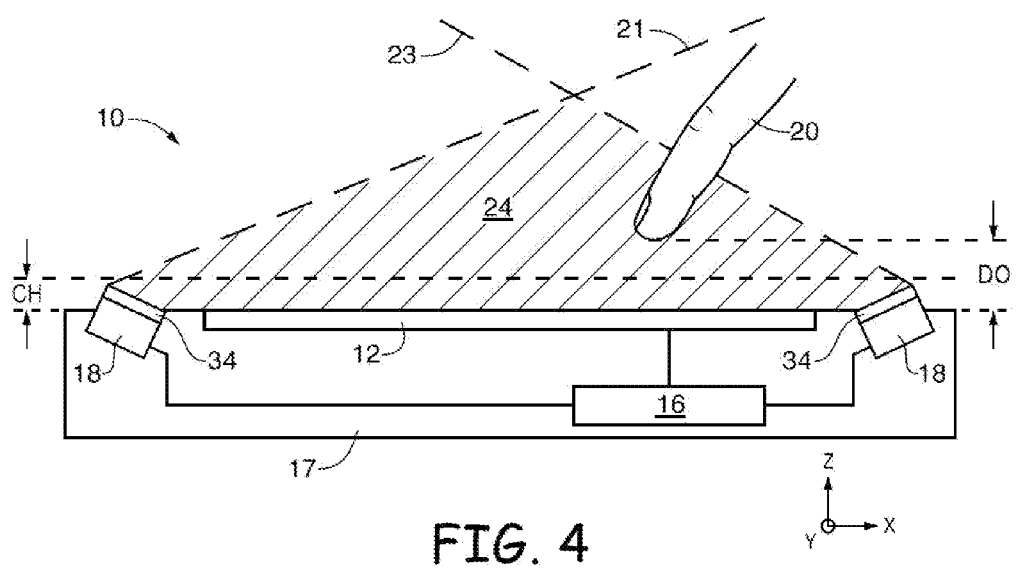
FIG. 4 is a cross-sectional side view of an illustrative electronic device having user interface cameras that are angled with respect to the outer surface of the device showing a three-dimensional tracking volume generated by the angled user interface cameras in accordance with an embodiment of the present invention.

The arrangement of FIG. 3 in which camera modules 18 are oriented having an outer surface that is parallel to the outer surface of display 12 is merely illustrative. If desired, camera modules 18 may be mounted in housing structure 17 with an outer surface that forms an angle other than 180 degrees with the surface of display 12 as shown in FIG. 4.

Figure 5:
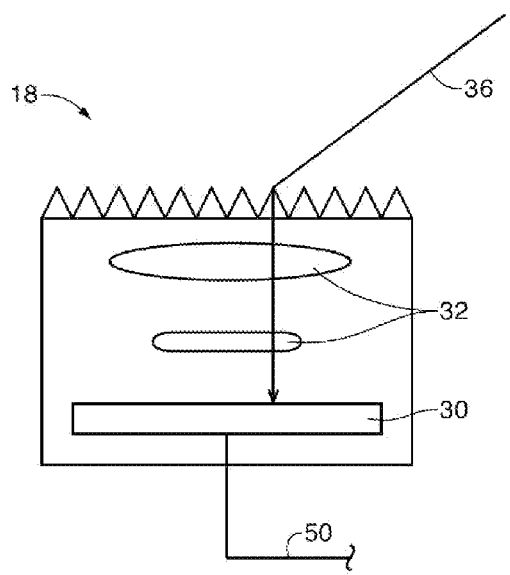
FIG. 5 is a cross-sectional side view of a user interface camera in accordance with an embodiment of the present invention.

FIG. 5 is a cross-sectional side view of one of camera modules 18 showing how camera module 18 may include an image sensor integrated circuit 30, a diffractive element 34 and one or more lenses 32. Diffractive element 34 and lenses 32 may redirect light 36 from a particular incidence angle into image sensor 30.

Image sensor 30 may be formed on a semiconductor substrate (e.g., a silicon image sensor integrated circuit die). Image sensor 30 may contain an array of image pixels configured to receive light of a given color by providing each image sensor with a color filter. The color filters that are used for image sensor pixel arrays in the image sensors may, for example, be red filters, blue filters, and green filters. Each filter may form a color filter layer that covers some or all of the image sensor pixel array. Other filters such as white color filters, dual-band IR cutoff filters (e.g., filters that allow visible light and a range of infrared light emitted by LED lights), etc. may also be used.

Image sensor 30 may have one or more image pixel arrays with any number of image pixels (e.g., complementary metal-oxide semiconductor (CMOS) image pixels, charge-coupled device (CCD) image pixels, etc.).

Image sensor 30 may transfer captured image data to other circuitry in device 10 (e.g., processing circuitry 16) over path 50.

Diffractive element 34 may include grating structures or other structures that redirect light from a first angle into a second angle as the light passes through the diffractive element. In this way, diffractive element 34 may orient the field-of-view of the camera module along a surface of the device such as an outer surface of the display.

Figure 6:
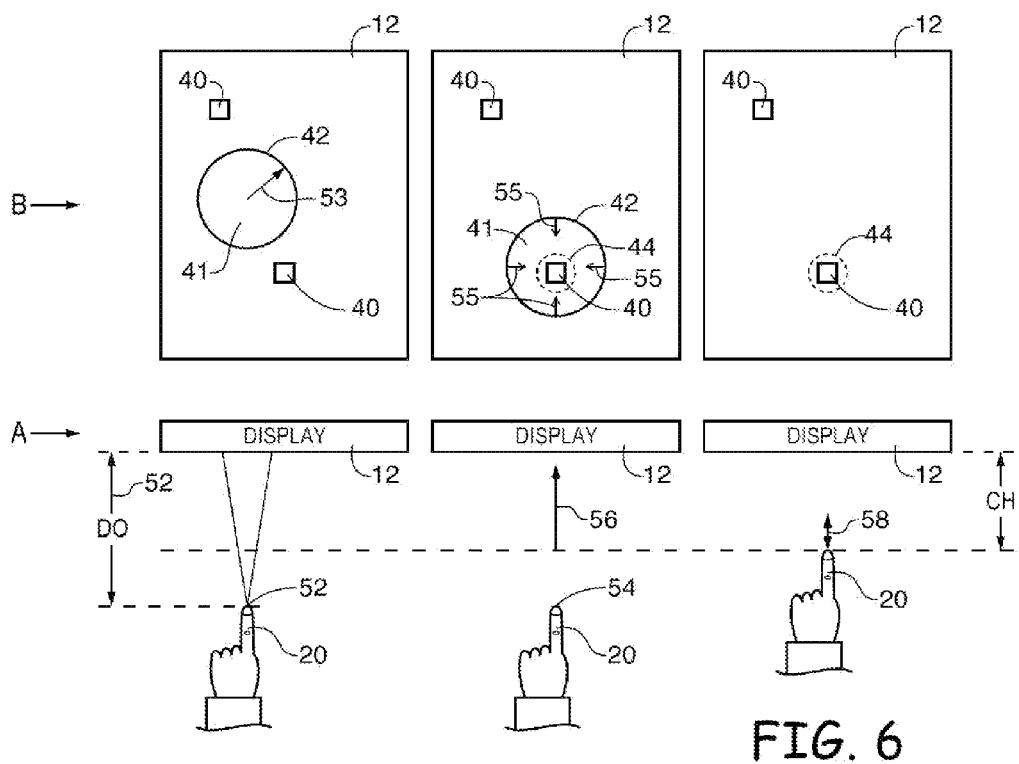
FIG. 6 is an illustrative diagram of an electronic device having an optical three dimensional user interface showing how three-dimensional user motions may be used to operate the device in accordance with an embodiment of the present invention.

FIG. 6 is a diagram showing how the operation of device 10 may be altered based on three-dimensional user gestures as detected by touch-free user interface components such as camera modules 18. In the diagram of FIG. 6, row A includes side views of display 12 and row B includes corresponding top views of display 12.

As shown in FIG. 6, visual content displayed on display 12 may be altered based on the detected position of user input member 20. In the example of FIG. 6, display 12 includes displayed icons 40. Icons 40 may, for example, represent user files or software applications stored on circuitry 16 of device 10.

Using camera modules 18, device 10 may detect the presence of member 20 at a first position 52. In response to detecting member 20 at position 52, device 10 (e.g., circuitry 16) may highlight a region such as region 41 using a visual marker such as circle 42 that surrounds the region. Marker 42 may have a size such as radius 53 that corresponds to the detected distance DO52 to position 52. In response to detecting movement of member 20 (e.g., to a second position 54), device 10 may move marker 42 in a corresponding direction and at a corresponding speed to highlight a second region 41'. Region 41' may include a displayed icon 40. Device 10 may highlight a displayed icon 40 near the center of marker 42 using an additional marker such as circle 44.

In response to detecting movement of member 20 toward display 12 in direction 56, device 10 (e.g., circuitry 16) may change the size of marker 42 (as indicated by arrows 55). In response to detecting that member 20 has moved to a distance that is equal to cursor height CH, device 10 may remove marker 42 from display 12 leaving only marker 44 around an icon 40 to be selected. In response to detecting a "clicking" motion at or within distance CH (as indicated by arrows 58), the highlighted icon 40 may be selected. Selecting the highlighted icon may include opening a user file or launching a software application (as examples).

Figure 7:
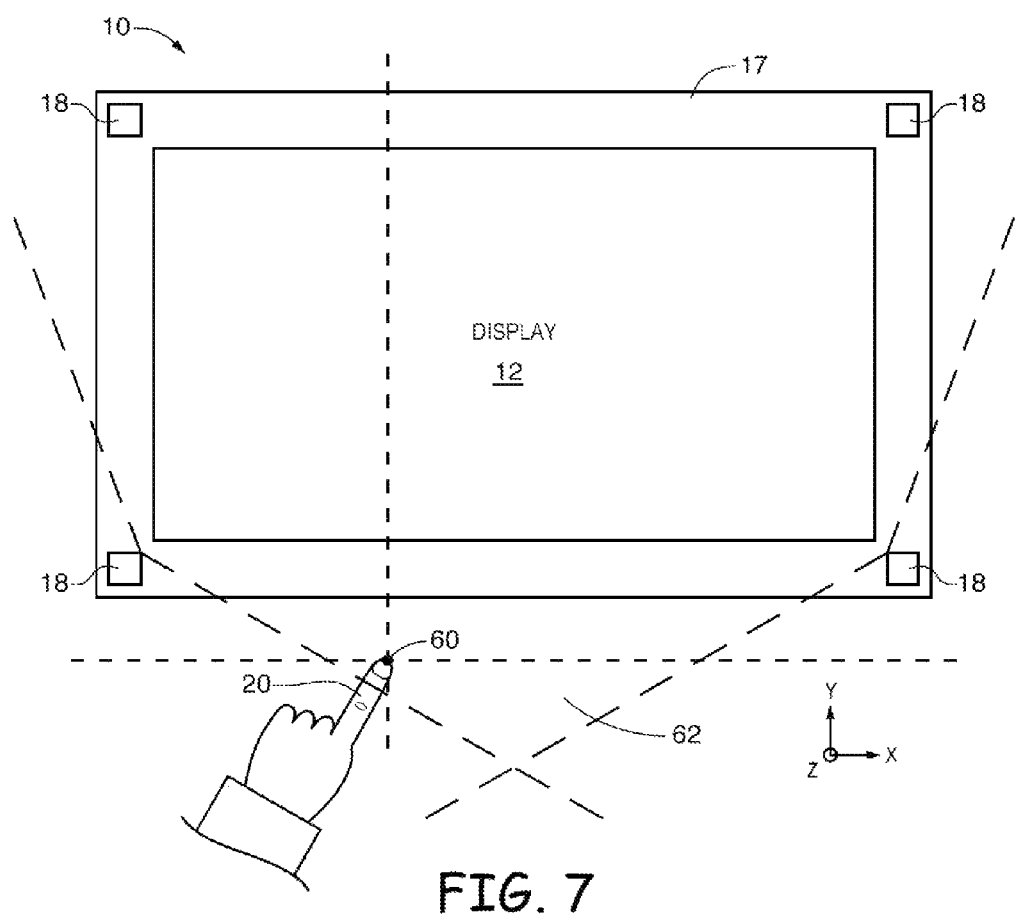
FIG. 7 is an illustrative diagram of an electronic device having a camera-based user interface showing how three-dimensional user motions outside of the display area of a device may be used to operate the device in accordance with an embodiment of the present invention.

FIG. 7 is a top view of device 10 showing how camera-based touch-free user input components such as camera modules 18 may be used to generate user input data based on user gestures executed in a location that is outside the display area of the device. The mounting angle and the diffractive elements of each camera module 18 may be arranged so that the overlapping fields-of-view of multiple camera modules 18 include a volume of space that includes a portion 62 that is outside the area of display 12 (i.e., that does not overlap display 12). User gestures executed at a location 60 within portion 62 of the overlapping fields-of-view of two or more cameras 18 and outside the display area of display 12 may be used (in addition to, or in place of user gestures in display area 12) to generate user input data for device 10. Display content on display 12 and other operational processes for device 10 may be altered using the generated user input data.

Figure 8:
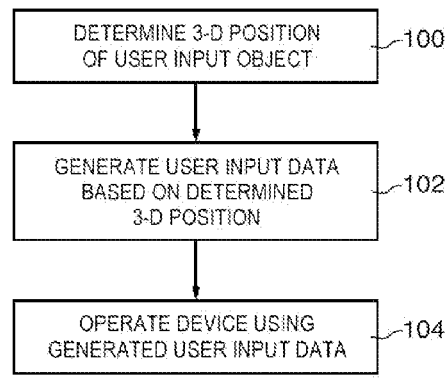
FIG. 8 is a flow chart of illustrative steps involved in operating an electronic device using camera-based user interface in accordance with an embodiment of the present invention.

Illustrative steps that may be used in operating an electronic device having camera-based touch-free user input components are shown in FIG. 8.

At step 100, a three-dimensional position of a user input object such as member 20 of FIGS. 3, 4, 6, and/or 7 may be determined. Determining the three-dimensional position of the user input object may include capturing images of the user input object using camera modules such as camera modules 18 and providing the images to processing circuitry such as circuitry 16 (see, e.g., FIG. 1). Circuitry 16 may use the known positions of camera modules 18 and the location of the user input object in images captured using the camera modules 18 to determine the three-dimensional position of the user input object. Determining the three-dimensional position of the user input object may include determining an object distance between the object and a portion of the device such as a display.

At step 102, user input data may be generated based on the determined three-dimensional position of the user input object. Generating user input data based on the determined three-dimensional position of the user input object may include generating user input data based the absolute three-dimensional position of the user input object and/or on changes in the determined three-dimensional position of the user input object.

At step 104, the device may be operated using the generated user input data. As examples, operating the device using the generated user input data may include changing display content on a device display, changing display content on a remote display, opening a user file, launching a software application, manipulating electronic documents, powering off the device or changing the operational mode of the device (e.g., from a three-dimensional user gesture input mode to a two-dimensional cursor mode).

Figure 9:
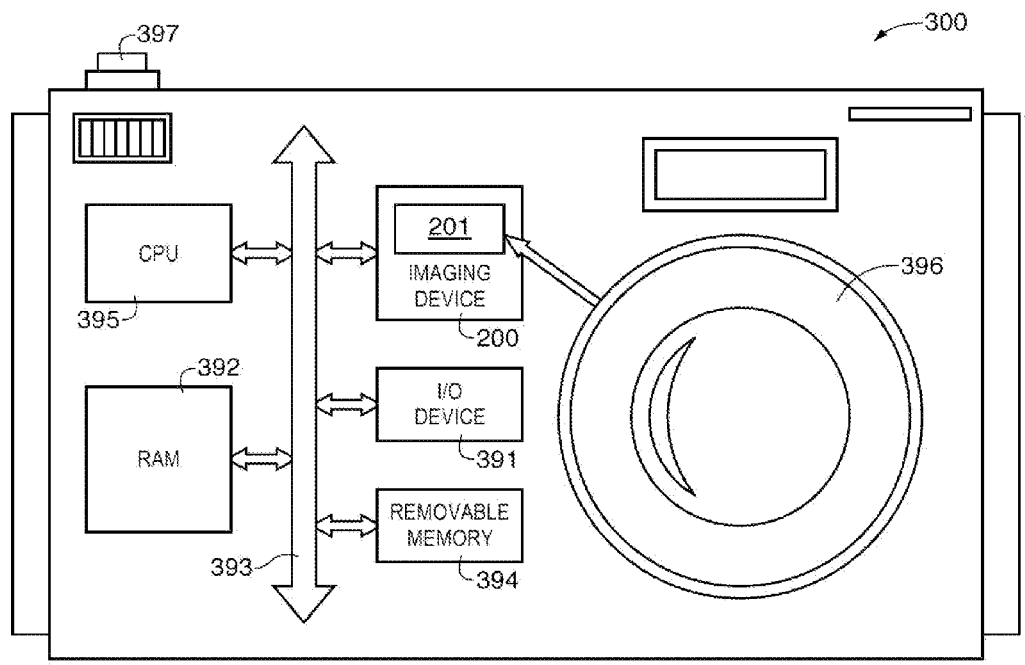
FIG. 9 is a block diagram of a processor system employing the embodiment of FIG. 1 in accordance with an embodiment of the present invention.

FIG. 9 shows in simplified form a typical processor system 300, such as an electronic device, which includes an imaging device such as imaging device 200 (e.g., an imaging device 200 such as user interface camera modules 18 of device 10 of FIG. 1). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating electronic devices having touch-free user input devices such as camera-based user input devices. Camera-based user input devices may include two or more camera modules mounted in the device or positioned at various positions around a work space for the device. The work space may include a portion of the device such as the device display or may include a non-device surface. The field-of-view of each camera module may partially overlap the field-of-view of one or more other camera modules. User gestures performed in this overlap region (sometimes referred to as a gesture tracking volume) may be imaged using the camera modules. Processing circuitry in the device may generate user input data based on the imaged user gestures in the gesture tracking volume and modify the operation of the device using the generated user input data.

The camera modules may be mounted in a housing structure at various locations around the display. The camera modules may have outer surfaces that are parallel to the surface of the display or angled with respect to the surface of the display. Each camera module may include an image sensor, one or more lenses, and a diffractive element that redirects the field-of-view of that camera module. The field-of-view of each camera module may include an extreme edge that runs long the surface of the display.

Operating the display based on the user input data may include highlighting and/or selecting displayed icons on the display based on the user gestures in the gesture tracking volume or otherwise modifying the operation of the display based on touch-free user input gestures.

The foregoing is merely illustrative of the principles of this invention which can be practiced in other embodiments.

What is claimed is:

1. An electronic device, comprising:
   a first camera module having a first field-of-view;

a second camera module having a second field-of-view that at least partially overlaps the first field-of-view;

processing circuitry configured to operate the device based on user gestures performed in a portion of the second field-of-view that overlaps the first field-of-view; and a display, wherein the processing circuitry is configured to operate the device based on the user gestures performed in the portion of the second field-of-view that overlaps the first field-of-view by altering display content on the display based on the user gestures performed in the portion of the second field-of-view that overlaps the first field-of-view, wherein the display has a planar outer surface and wherein the first field-of-view has an extreme edge that runs along the planar outer surface of the display.

2. The electronic device defined in claim 1 wherein the second field-of-view has an extreme edge that runs along the planar outer surface of the display.

3. The electronic device defined in claim 1 wherein the first camera module has an outer surface that is parallel to the planar outer surface of the display.

4. The electronic device defined in claim 1 wherein the first camera module has an outer surface that is mounted at an angle other than 180 degrees with respect to the planar outer surface of the display.

5. The electronic device defined in claim 1, further comprising:

a housing structure, wherein the first camera module and the second camera module are mounted within the housing structure.

6. The electronic device defined in claim 1, further comprising:

a third camera module having a third field-of-view that at least partially overlaps the first field-of-view and the second field-of-view, wherein the processing circuitry is configured to operate the device based on user gestures performed in a portion of the third field-of-view that overlaps the second field-of-view and the first field-of-view.

7. The electronic device defined in claim 6, further comprising:

a fourth camera module having a fourth field-of-view that at least partially overlaps the first field-of-view, the second field-of-view, and the third field-of-view, wherein the processing circuitry is configured to operate the device based on user gestures performed in a portion of the fourth field-of-view that overlaps the third field-of-view, the second field-of-view, and the first field-of-view.

8. An electronic device, comprising:

a first camera module having a first field-of-view;

a second camera module having a second field-of-view that at least partially overlaps the first field-of-view;

processing circuitry configured to operate the device based on user gestures performed in a portion of the second field-of-view that overlaps the first field-of-view; and a display, wherein the processing circuitry is configured to operate the device based on the user gestures performed in the portion of the second field-of-view that overlaps the first field-of-view by altering display content on the display based on the user gestures performed in the portion of the second field-of-view that overlaps the first field-of-view, wherein the first camera module comprises:

an image sensor for capturing images of objects in the first field-of-view; and a diffractive element that redirects the first field-of-view so that an outer edge of the first field-of-view runs along a surface of the display.

9. A system, comprising:

a central processing unit;

memory;

input-output circuitry; and a touch-free user input device, wherein the touch-free user input device comprises:

a first camera module having a first field-of-view;

a second camera module having a second field-of-view that at least partially overlaps the first field-of-view;

processing circuitry configured to operate the system based on user gestures performed in a portion of the second field-of-view that overlaps the first field-of-view; and a display having corners, wherein the first camera module and the second camera module are each mounted adjacent to a selected one of the corners of the display, and wherein each camera module includes an image sensor having an array of image pixels and a diffractive element that redirects light onto the array of image pixels.

10. The electronic device defined in claim 1 wherein the extreme edge of the first field-of-view is parallel to the outer surface of the display.

\* \* \* \* \*